H. G. STREET.
Shovel Plow.
No. 30,773. Patented Nov. 27, 1860
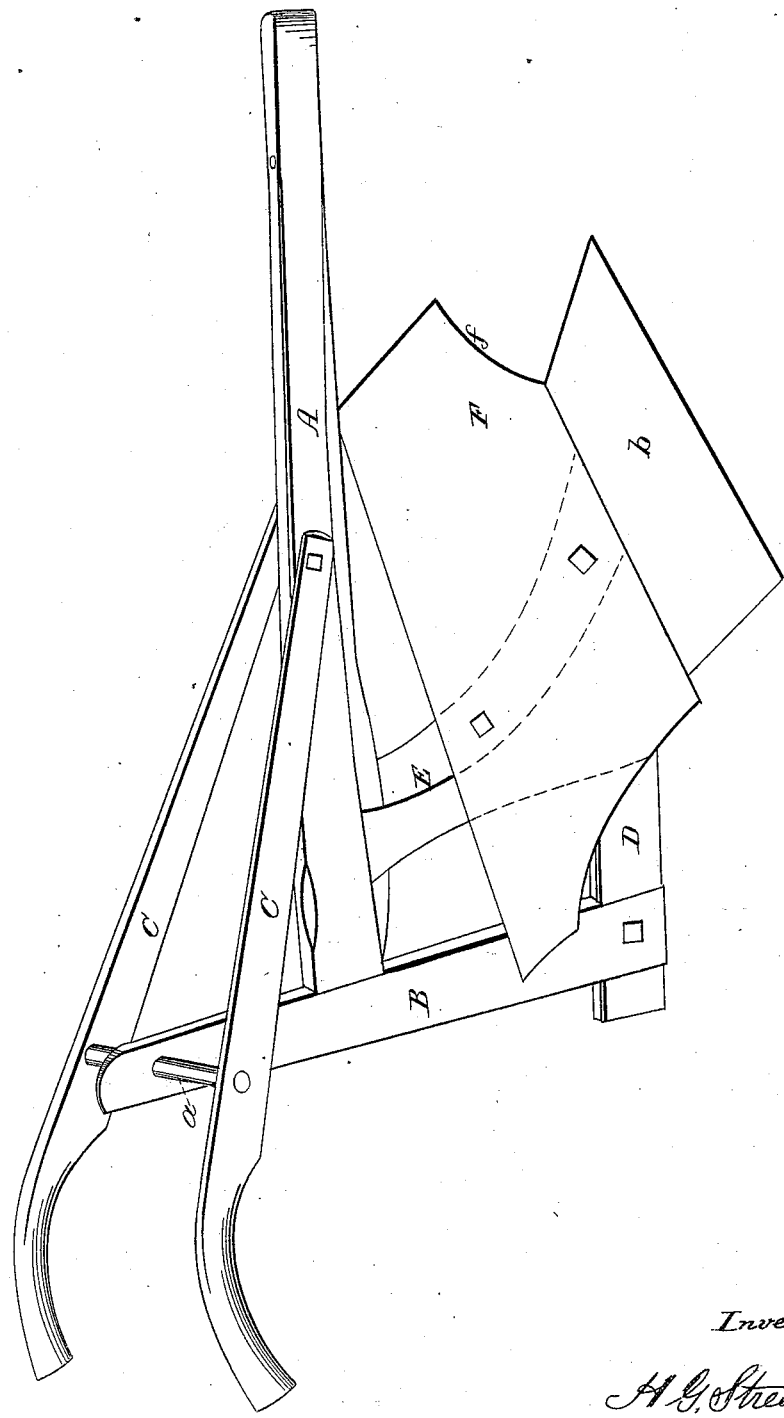
Witnesses
Edw. F. Brown
J. R. Woodruff
Inventor
H. G. Street

UNITED STATES PATENT OFFICE.

HENRY G. STREET, OF LIBERTY, MISSISSIPPI.

IMPROVEMENT IN COTTON-CULTIVATORS.

Specification forming part of Letters Patent No. 30,773, dated November 27, 1860.

*To all whom it may concern:*

Be it known that I, HENRY G. STREET, of the town of Liberty, in the county of Amite, and the State of Mississippi, have invented new and useful Improvements in a Cotton Scraper and Plow; and I do hereby declare that the following is a clear and exact description of the same, reference being had to the accompanying drawing, making a part of this specification.

My invention relates to the cotton cultivation; and it consists in the arrangement of devices hereinafter described.

To enable others skilled in the art to make and use my invention, I will describe it more fully, referring to the drawing and the letters marked thereon.

A is the beam, framed into a standard, B, at the rear end, and the handles C C are bolted to the beam in about the middle, and are supported back by a bar, $a$, passing through them and the standard B in the usual manner of constructing cotton plows or scrapers.

To the bottom end of the standard B is bolted a bar of cast or wrought iron, D, to which the point $b$ is firmly attached, it being made in a strip of about four or five inches in width, or wider, if it is desirable to loosen the earth deeper, and inclined at an angle of about sixty degrees. There is also another bar of metal, E, bolted to the horizontal bar D, which is connected to the beam A in such manner as to brace and strengthen the points $b$, and is twisted, so as to give it the right shape and a flat surface on which to secure the scraper-blade F, which extends over and above the point $b$, the lower edge and extended part being made sharp, so as to cut its way clear, and curved upward, as seen at $f$, for the purpose of rounding up and shaping the ridge left for the row of cotton-plants at the same time that the furrow is opened to admit air and moisture to the roots. This constitutes the main feature of my invention, and performs the functions of plowing and scraping at one and the same time, so that in once passing over the fields there is as much accomplished by my very simple invention as there is in passing two or three times in the ordinary manner.

I do not claim separately any of the parts or devices when viewed irrespective of the arrangement described. Neither do I claim the devices embraced in the patent granted to D. K. Thorn, October 25, 1857; but

What I claim as new, and desire to secure by Letters Patent, is—

The arrangement of beam A, handles C C, standards B and E, bar D, share or point $b$, and scraper F, with its curve $f$, the whole being constructed in the manner and for the purposes herein described.

H. G. STREET.

Witnesses:
EDM. F. BROWN,
J. B. WOODRUFF.